No. 849,950. PATENTED APR. 9, 1907.
G. A. WEAVER.
AXLE.
APPLICATION FILED APR. 21, 1906.
2 SHEETS—SHEET 1.
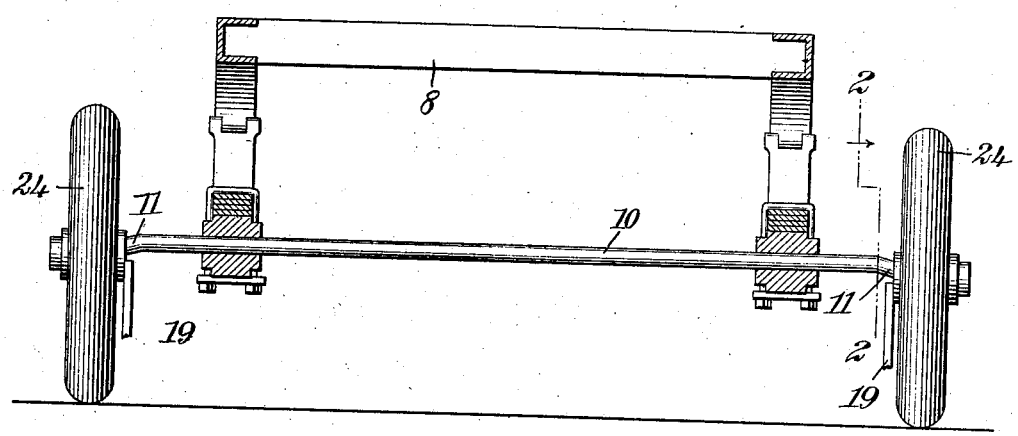
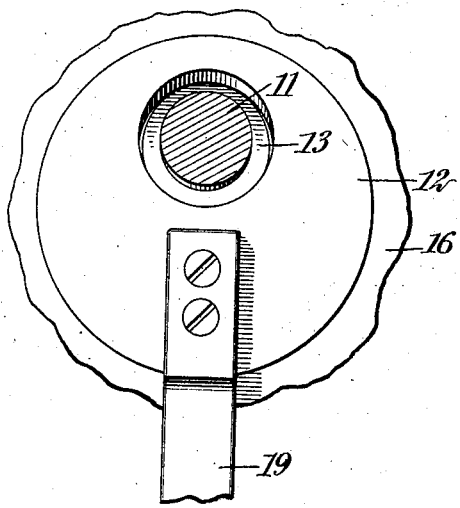
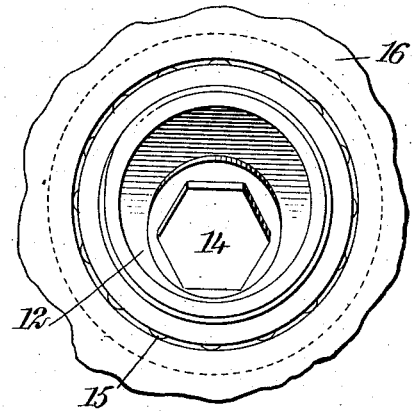
WITNESSES
INVENTOR
George A. Weaver
BY
ATTORNEYS No. 849,950. PATENTED APR. 9, 1907.
G. A. WEAVER.
AXLE.
APPLICATION FILED APR. 21, 1906.
2 SHEETS—SHEET 2.
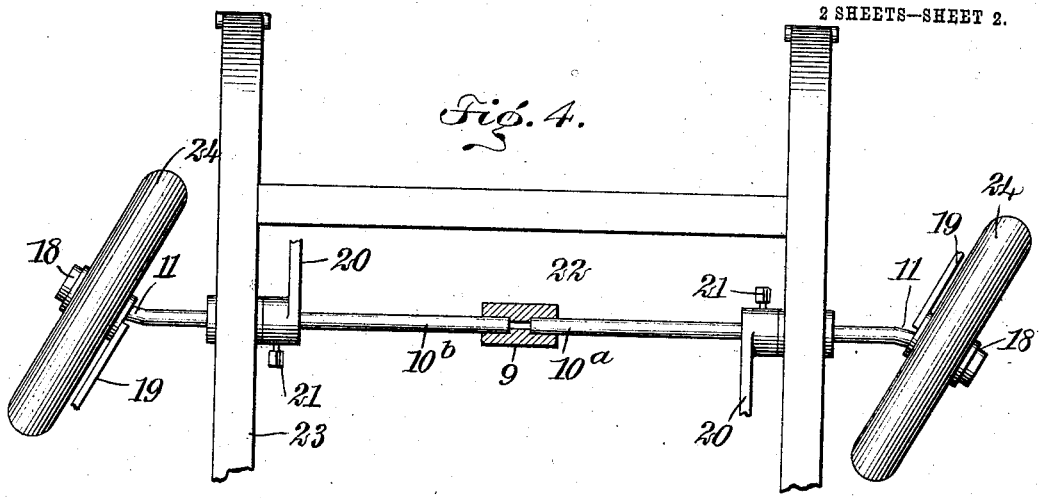
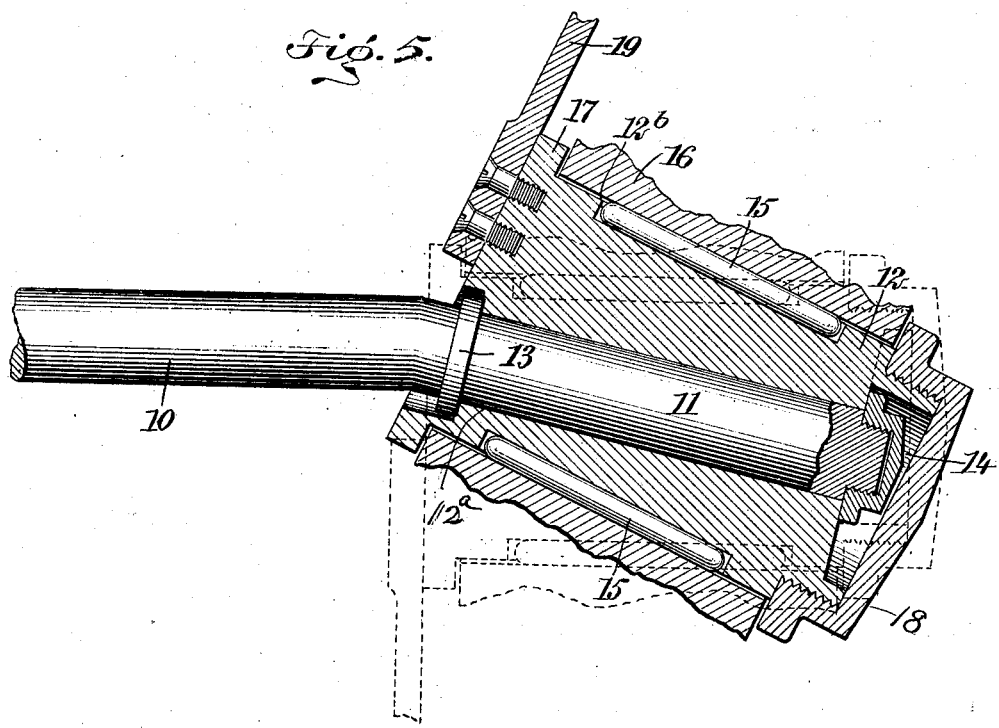
WITNESSES
INVENTOR
George A. Weaver
BY
ATTORNEYS

UNITED STATES PATENT OFFICE.

GEORGE A. WEAVER, OF NEWPORT, RHODE ISLAND.

AXLE.

No. 849,950.  Specification of Letters Patent.  Patented April 9, 1907.

Application filed April 21, 1906. Serial No. 312,979.

*To all whom it may concern:*

Be it known that I, GEORGE A. WEAVER, a citizen of the United States, and a resident of Newport, in the county of Newport and State of Rhode Island, have invented a new and Improved Axle, of which the following is a full, clear, and exact description.

My invention relates to the axles of vehicles. While the invention is capable of use with all vehicles, it is especially useful in automobile construction.

The object of the invention is to provide an improved arrangement for mounting the wheels upon the frame, which will enable the direction of the wheels to be easily controlled.

A further object is to provide a strong axle construction which will dispense with the usual steering-knuckle and its accessories.

Reference is to be had to the accompanying drawings, forming a part of this specification, in which similar characters of reference indicate corresponding parts in all the figures.

Figure 1 is a vertical section through the frame of an automobile fitted with my axle. Fig. 2 is a sectional view on the line 2 2 of Fig. 1 and showing the inner end of the wheel-hub in elevation. Fig. 3 is an elevation of the outer side of the arm and hub with the cap-nut removed. Fig. 4 is a plan of the forward extremity of the frame of an automobile, representing the axle with the wheels set as in steering the machine toward the right; and Fig. 5 is a sectional view at the right-hand hub.

Referring more particularly to the parts, and especially to Fig. 1, 8 represents a frame, supported upon a transverse forward axle 10. The projecting extremities of this axle are bent down at an angle, as indicated, to form inclined arms 11. On each of the said arms, as indicated in Fig. 5, I mount a bushing 12, provided with a bore $12^a$, which receives the arm 11, as shown, the said bore being inclined with respect to the axis of the bushing. Near its inner extremity the arm 11 is provided with a collar 13, against which the extremity of the bushing 12 abuts, as shown, and the bushing is retained in position by means of a suitable axle-nut 14. The outer extremity of the bushing 12 is recessed to receive the axle-nut, as shown, and is reduced and threaded, as indicated, to receive a cap-nut 18. It should be understood that the bushing 12 is of cylindrical form, its face being provided with a circumferential groove or raceway $12^b$, which receives a plurality of rollers 15, said rollers being retained in position by the hub 16 of the wheel. The inner extremity of the hub 16 abuts against a collar 17, which is formed so as to project laterally from the bushing, as shown, and the cap-nut 18 projects, as indicated, so that it affords means for retaining the wheel-hub, as will be readily understood.

Upon the inner face of the bushing 12 a lever 19 is attached rigidly, and this lever affords means for holding the bushing 12 in any desired position upon the arm 11, it being understood that the bushing is loosely mounted on the arm.

The normal position of the arms 11 is such that they project downwardly, their axes being disposed in a vertical plane, as in Fig. 1. The normal position of the bushing with respect to the arm is shown in Fig. 5 in dotted outline, at which time the geometrical axis of the bushing is horizontal and of course parallel with the body of the axle. When the parts are in this relation, evidently the wheels 24 will be disposed in a front and rear direction. In order to direct the machine toward the right, the lever 19 is moved toward a forward position, as indicated in Fig. 4 at the right, so as to bring the bushing 12 toward the position indicated in Fig. 5 in full lines. In this way its eccentricity or obliquity throws the wheel toward the right. It should be understood that the operation just described applies to the arm 11, which is disposed at the right of the frame. The operation at the opposite side of the frame is reversed of course, the lever 19 at that side being rotated in an opposite direction to the lever 19 at the right. Evidently the change in direction of the wheels 24 will be proportionate to the amount of rotation of the bushing.

With the construction just described the axle 10 is made in one unbroken piece. I may provide a construction which enables the side or angular movement of the wheels to be increased over that derived from the simple arrangement referred to above. Such a construction is shown in Fig. 4. The axle is made in two alining sections $10^a$ and $10^b$, united by a coupling 9, so that the two axle-sections are free to rotate independently. Levers 20 are attached rigidly by set-screws 21 to the axle-sections $10^a$ and $10^b$, respectively. To direct the vehicle toward the right, the axle-section $10^a$ is rotated so that the arm 11 thereof projects rearwardly. If the lever 19 at this side is previously thrown forward, the change of direction due to that movement is added to the first, so that a displacement, such as that shown in Fig. 4, results. At the left of the vehicle of course the directions of movement for the levers are reversed.

With the construction described above evidently if the axes of the arms 11 project upwardly in a vertical plane the weight of the body of the automobile tends to keep the wheels in a front and rear position—that is, there is no tendency at least to rotate the arms 11 out of a vertical plane. Furthermore, the wheels may be directed as desired simply by a rotary movement, and the mechanism for controlling the same dispenses with the use of steering-knuckles, avoiding the disadvantages which are inherent thereto.

Although I have described the device as applied to the front axle, it may be as readily applied to the rear axle in practical use.

Having thus described my invention, I claim as new and desire to secure by Letters Patent—

1. In combination, a frame having an arm rotatably mounted thereupon, said arm being inclined with respect to the axis of rotation thereof on said frame, a wheel carried by said arm, and means for rotating said arm to adjust the position of said wheel.

2. An axle having a rotatable arm, the axis whereof is inclined, a wheel mounted upon said arm, and means for rotating said arm to throw the axis thereof forwardly or rearwardly in steering.

3. An axle having an arm, the axis whereof is inclined to the body of said axle, a bushing having a bore therein receiving said arm, said bore being inclined to the axis of said bushing, a wheel rotatably mounted on said bushing, and means for controlling the position of said bushing upon said arm.

4. An axle having an inclined arm, a bushing having an inclined bore rotatably mounted on said arm, a wheel rotatably mounted on said bushing, and means for rotating said arm upon the axis of said axle.

5. In combination, a frame, arms rotatably mounted in said frame on opposite sides thereof and having their axes inclined with respect to the axis of rotation thereof, bushings having bores respectively therein, inclined with respect to the axes thereof and mounted upon said arms, wheels mounted on said bushings, and means for controlling the position of said bushings and said arms.

6. In combination, a frame, an axle extending continuously in one piece from one side to the other of said frame and supporting said frame, said axle having inclined arms at the extremities thereof, bushings mounted upon said arms and having their axes inclined to the axes of said arms, wheels carried on said bushings, and means for rotating said bushings.

In testimony whereof I have signed my name to this specification in the presence of two subscribing witnesses.

GEORGE A. WEAVER.

Witnesses:
F. D. AMMEN,
JNO. M. RITTER.